United States Patent
Narayanan

(10) Patent No.: US 10,250,582 B2
(45) Date of Patent: Apr. 2, 2019

(54) SECURE PRIVATE LOCATION BASED SERVICES

(71) Applicant: Microsoft Technology Licensing, LLC, Redmond, WA (US)

(72) Inventor: Kaushik Ramaiah Narayanan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 15/231,507

(22) Filed: Aug. 8, 2016

(65) Prior Publication Data
US 2018/0041489 A1 Feb. 8, 2018

(51) Int. Cl.
| | | |
|---|---|---|
| *H04L 29/00* | (2006.01) | |
| *H04L 29/06* | (2006.01) | |
| *H04W 12/06* | (2009.01) | |
| *H04W 12/08* | (2009.01) | |
| *H04W 4/02* | (2018.01) | |
| *H04W 4/80* | (2018.01) | |

(Continued)

(52) U.S. Cl.
CPC .......... *H04L 63/08* (2013.01); *H04L 63/101* (2013.01); *H04L 63/102* (2013.01); *H04W 4/025* (2013.01); *H04W 4/80* (2018.02); *H04W 12/06* (2013.01); *H04W 12/08* (2013.01); *G06F 21/35* (2013.01); *G06Q 30/0261* (2013.01); *H04W 4/021* (2013.01)

(58) Field of Classification Search
CPC ..... H04L 63/08; H04L 51/046; H04L 63/101; H04L 63/102; H04L 67/327; H04L 67/36
See application file for complete search history.

(56) References Cited

U.S. PATENT DOCUMENTS

| | | |
|---|---|---|
| 7,603,360 B2 | 10/2009 | Ramer et al. |
| 8,229,358 B2 * | 7/2012 | Caudevilla Laliena ..................... H04L 63/08 455/41.2 |

(Continued)

OTHER PUBLICATIONS

"International Search Report and Written Opinion Issued in PCT Application No. PCT/US2017/044997", dated Oct. 9, 2017, 12 Pages.

(Continued)

*Primary Examiner* — Ghazal B Shehni
(74) *Attorney, Agent, or Firm* — Jeffrey L. Ranck; Ranck IP Law

(57) ABSTRACT

Representative embodiments disclose unique mechanisms to use beacons to provide access to cloud services. In order to access the cloud services a user presents a beacon identifier obtained from a beacon in geographic proximity to a user device used by the user. An authentication service receives the beacon identifier and issues an authentication challenge to the user. Upon successfully completing the authentication challenge, the user is granted access to the cloud service. Authentication challenges can include single factor, two factor, or nominal security challenges. Some embodiments require the device to submit GPS data verifying the location of the device. Some embodiments check user identifying information against a set of approved users. Some embodiments allow a user's device to act as a beacon to access the cloud service. Cloud services can include a wide variety of collaboration, productivity, help, mapping and other services.

17 Claims, 9 Drawing Sheets

(51) Int. Cl.
*G06F 21/35* (2013.01)
*G06Q 30/02* (2012.01)
*H04W 4/021* (2018.01)

(56) References Cited

U.S. PATENT DOCUMENTS

| | | | |
|---|---|---|---|
| 8,370,147 | B2 | 2/2013 | Kennewick et al. |
| 8,874,592 | B2 | 10/2014 | Flake et al. |
| 9,223,776 | B2 | 12/2015 | Bernard |
| 2011/0029370 | A1 | 2/2011 | Roeding et al. |
| 2011/0113252 | A1 | 5/2011 | Krischer et al. |
| 2015/0208226 | A1 | 7/2015 | Kuusilinna et al. |
| 2015/0269624 | A1 | 9/2015 | Cheng et al. |
| 2016/0012412 | A1 | 1/2016 | Scanlon et al. |
| 2016/0014582 | A1 | 1/2016 | Dobyns |
| 2016/0042396 | A1 | 2/2016 | Dobyns |
| 2016/0119320 | A1 | 4/2016 | Bansal et al. |
| 2016/0156638 | A1* | 6/2016 | Somani .................. H04L 63/12 726/7 |
| 2016/0205091 | A1 | 7/2016 | Matsuda |

OTHER PUBLICATIONS

"Estimote Real-world context for your apps", Retrieved on: Mar. 21, 2016 Available at: http://estimote.com/.

Dhar, et al., "Challenges and business models for mobile location-based services and advertising", In Magazine Communications of the ACM, vol. 54, Issue 5, May 2011, pp. 121-129.

Rani, et al., "Location Based Services in Android", In International Journal of Advances in Engineering & Technology, vol. 3, Issue 1, Mar. 2012, pp. 209-220.

Horton, Chris., "What is Proximity Based Marketing?", Published on: Feb. 3, 2016 Available at: http://engage.synecoretech.com/marketing-technology-for-growth/what-is-proximity-based-marketing.

"How Brands and Retailers can go Omni Channel using Beacons", Published on: Aug. 6, 2015 Available at: http://www.beaconstac.com/pdf/How_brands_and_retailers_can_go_Omni_Channel_using_Beacons_Ebook.pdf.

* cited by examiner

SECURE PRIVATE LOCATION BASED SERVICES

FIELD

This application relates generally to location based services such as those tied to a beacon device. More specifically, embodiments disclosed herein provide secure, private location based services that can be tied to a beacon device and that utilize a unique framework infrastructure.

BACKGROUND

Beacon devices send a beacon identifier (ID) over a short-range wireless link such as Bluetooth LE when a device comes in range. To date, beacons have been applied in scenarios that mostly involve advertising and marketing. A common scenario where beacons are used is to help users access advertisement services that are tied to a particular geographic location. For example, as users enter a store, advertisements and coupons can be pushed to a user's phone so the user can be encouraged to purchase goods and services in the store. Beacon based services are open to all and users gain access to the services simply by virtue of being in physical proximity to a beacon signal.

The use of beacon technology has been slow to catch on and most users have not experienced any interaction with beacons or beacon technology. Furthermore, beacon use has been mostly limited to the world of advertising and marketing. The use of today's beacons typically requires a store owner to create and maintain their own infrastructure in order to provide the benefits that such technology can bring to the store.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Companies, individuals, business, and others (collectively subscribers) are able to acquire cloud services from a wide variety of cloud service providers. These cloud services can include productivity offerings (word processing, file sharing, presentation software, collaboration offerings, email, calendaring, project management, courseware, and so forth), personal digital assistants, mapping and routing, and numerous other offerings. Today, each subscriber that acquires such offerings typically utilizes the offerings for their own purposes or makes the offerings available to their employees. Such cloud service offerings are rarely, if ever, used to provide benefit to a subscriber's customers. Furthermore, these cloud service offerings are not tied to particular locations.

Embodiments disclosed herein include architectures, systems, methods, and so forth for using beacons to provide cloud services that are tied to particular locations. This makes it possible for subscribers to acquire cloud services and then offer cloud services to employees, customers and so forth in new and unique ways. The subscribers can acquire cloud services from a cloud service provider and then offer location based cloud services to their customers, employees, etc. based on the acquired cloud services. This allows subscribers to offer location based cloud services to their customers, employees, etc. without the need to develop and maintain a beacon infrastructure and specific cloud services. The disclosed embodiments allow a subscriber to offer secure, private location based cloud services.

The disclosure below presents a variety of architectures, systems, methods and so forth and illustrates numerous use scenarios where the disclosed embodiments can be used to offer location based cloud services in new and unique ways.

Description

Figure 1:
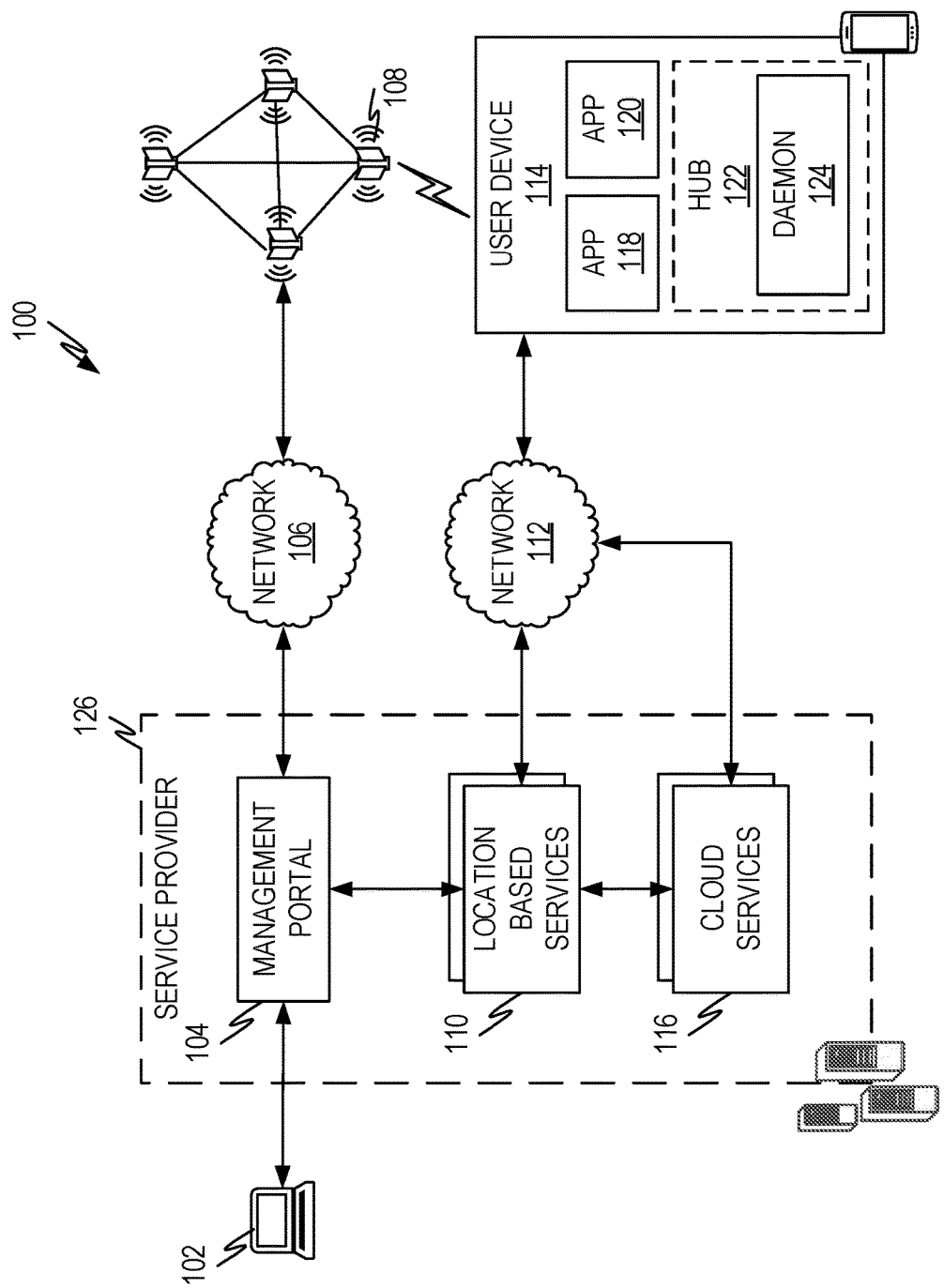
FIG. 1 illustrates an example architecture of a system to provide secure location based services.

FIG. 1 illustrates an example architecture 100 of a system to provide secure location based services. A subscriber 102 acquires various cloud services 116 from a service provider 126. The subscriber 102 can then use the acquired cloud services 116 to offer location based services 110 to customers, employees, etc. (collectively users). In order to do this the subscriber utilizes beacons 108 to "tie" the location based services 110 to one or more particular geographic locations. In FIG. 1, beacons 108 can be of a wide variety of types from various manufactures.

As of the date of this disclosure, beacons come in two major technical variations. One class of beacons operate independently and are not tied to any type of network. Such beacons are typically configured with a beacon ID and/or other information at a particular location and then emplaced at a physical location where they reside. Another class of beacons operate in a network, where the beacons can exchange information among themselves and, with appropriate configuration, connect to a wider network, such as network 106, that allows remote access to the beacons. This has the advantage of allowing the beacons, such as beacons 108 to be configured remotely. Either type of beacon will work in the context of the disclosed embodiments. Local only access may be more difficult when beacons need to be reconfigured while remote access to beacons allows them to be managed and configured remotely, which can make it easier for service providers 126 to offer beacon services to subscribers 102 and allows subscribers 102 to reconfigure beacons as needed.

In order to manage the location based services, the subscriber 102 logs into a management portal 104. The management portal 104 acquires information on the available beacons, their location, the cloud services that are available, the location based service offerings and so forth and configures the location based services the subscriber wants to offer to accomplish the use scenarios desired. The management portal 104 is typically presented in the form of an interactive web page or application that allows a subscriber to perform various management functions as described herein.

Through the management portal the subscriber maps the available beacons to devices, services/applications (collectively services), locations and so forth. This mapping determines what services will be made available at any particular location(s). The management portal allows the subscriber to configure the various authentication challenges that are to be used in conjunction with the services that are being offered. The authentication challenges allow the subscriber to secure the services so that they are private to authorized users.

The management portal 104 can also offer other management type operations as well as status and other aggregated business intelligence data. For example, the management portal 104 can provide status and other health information regarding to the cloud services 116 and/or location based services 110. Other examples include allowing the subscriber 102 to access health information regarding the beacons 108, the frequency of pings against the various beacons 108 mapped to services and so forth, the signal strength of the various beacons 108, and so forth. The management portal 104 also allows the subscriber 102 to access logs, including logs that relate to the authentication used by the various services. These logs can help a subscriber identify security risks and related problems that arise in the context of security and/or privacy of private services. In short, the management portal 104 can provide any functionality that allows a subscriber 102 to 1) configure offered services, 2) understand the heath of the offered services, 3) evaluate the effectiveness, utility and value of the offered services, and so forth.

In this architecture 100, a service provider 126 is illustrated as offering both the cloud services 116, the location based cloud services 110, and the management portal 104. However, in some embodiments, the service provider 116 may only offer some of these while other portions are offered by other service providers, by the subscriber (i.e., in the case of private cloud services), or some other entity.

A user typically access the offered location based services 110 and/or cloud services 116 through a device 114 that can interact with one or more beacons 108. For example, the user device 114 comes into physical proximity of one or more beacons and acquires a beacon ID over a short range wireless connection (i.e., Bluetooth LE, or other short range wireless link). Beacon IDs are typically designed to be unique so that no two beacons provide the same beacon id. In some embodiments, beacon IDs comprise three portions, a UUID of a particular length (i.e., 16 bytes), a major ID (i.e., a two byte string) and a minor ID (i.e., a two byte ID). UUIDs are typically used to differentiate between groups of related beacons. For example, beacons provided by a particular company, in a particular area, or other related grouping can have the same UUID. The major and minor portions are then used to distinguish between smaller groups of related beacons. For example, if the UUID were beacons of a particular company, the major ID could be used to identify beacons in a particular building, store, etc. while the minor ID could be a location within the building, store, etc. such as a conference room, office, etc.

Once acquired, the beacon ID is sent by the user device to the location based services 110, typically over a network 112. The user device 114 can acquire the beacon ID based on built in functionality or based on some sort of application. The user device 114 can then send the beacon ID using the wireless (or wired) network connectivity of the device 114. For example, a "hub" program/application 122 and/or a daemon 124 (hereinafter referred to as daemon 124) can monitor for incoming beacon IDs and then send them to the appropriate location based service 110. The daemon 124 can be programmed to send the beacon ID to the appropriate location base service 110 based on the UUID and/or based on the location of the device, and/or based on any other criteria/combination. While each of these options represent slightly different operation and have slightly different implications (i.e., from an operations and system standpoint), they result in the user device 114 knowing (i.e., through daemon 124) where to send the received beacon ID.

Once location based services 110 receive the beacon ID, the location based services can take a variety of actions, according to the particular embodiments. Some of these options are explained in conjunction with FIG. 5 below. At this point in the description it is sufficient to say upon receiving the beacon ID, the location based serviced 110 will perform as configured (i.e., through the management console 104). This means that the location based services 110 will verify the beacon ID and then take the appropriate action. In some embodiments this results in the location based services 110 sending back information to the user device 114 that informs the user what services are offered and available. In this way the user can discover what services are available at the location where the device is located. In some embodiments the location based services 110 will issue an authentication challenge to the user device so that the location based services 110 can verify the identity of the user of the device, the device itself, or some other aspect, such as the employer of the user, whether the user is authorized to access a particular service, etc. The authentication challenge can be issued before and/or after the discovery aspect.

Once the location based services 110 have authenticated the user (or other aspects as described above), the location based services 110 can grant access to the authorized, appropriate and/or requested cloud services 116. This can mean that the location based services 110 act as an intermediary between the user device 114 and the cloud services 116 or the location based services 110 can send information to the user device 114 that will allow the user device to access the authorized, appropriate, and/or requested cloud services 116. The information can include a link (i.e., web address or other mechanism) to access the cloud services 116, a token to access the cloud services 116, credentials to access the cloud services 116 and/or any combination thereof.

Particular use scenarios are presented below as representative examples of how the architecture can be used to provide a wide variety of services in a wide variety of scenarios.

Figure 2:
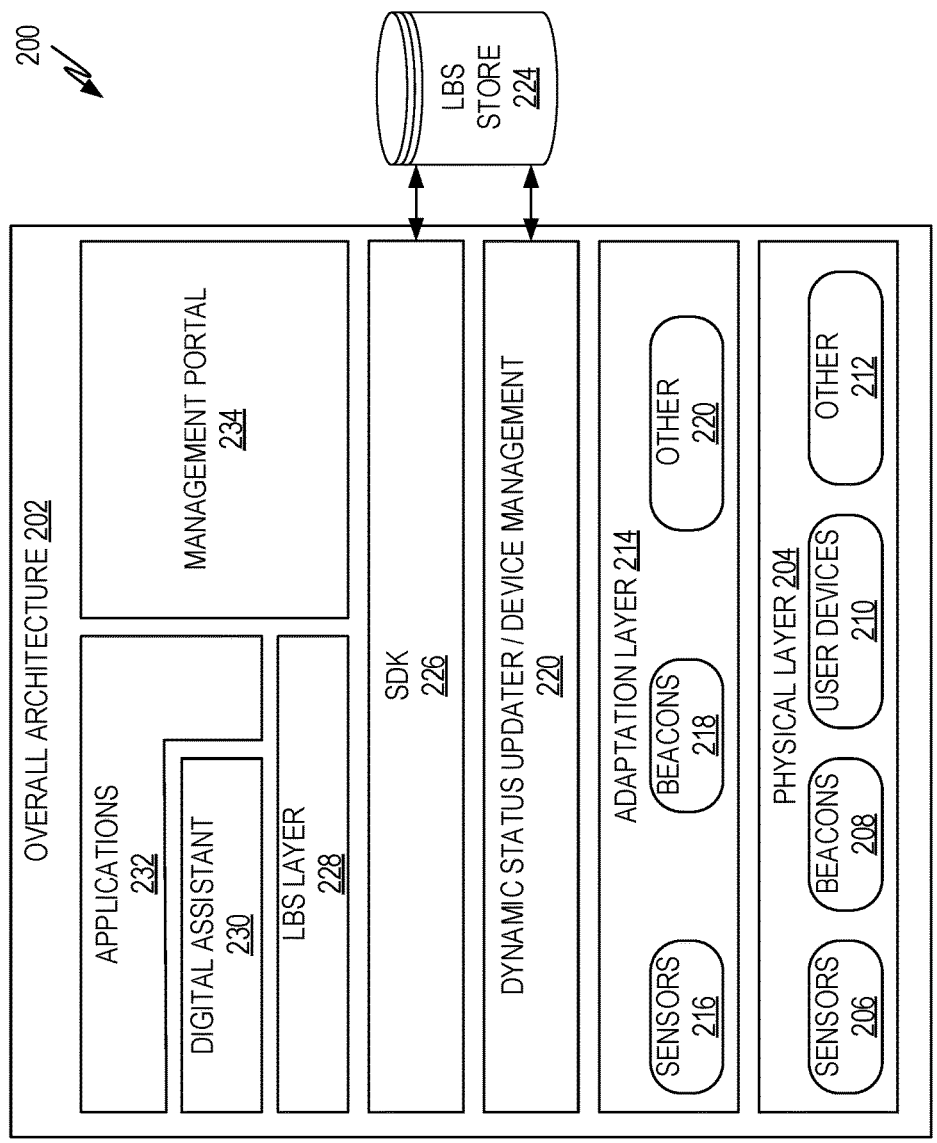
FIG. 2 illustrates an example infrastructure that can be used by a service provider to allow subscribers to provide secure, location based services to end users.

FIG. 2 illustrates an example infrastructure 200 that can be used by a service provider to allow subscribers to provide secure, location based services to end users. In this infrastructure 200, the overall architecture 202 has a variety of layers. The layers provided are representative of the model used to provide access to various services.

The physical layer 204 represents the various devices and other entities that the architecture interacts with to provide the services. The physical layer 204 isn't a layer in the sense that the "higher" layers are implemented on the physical layer. Rather, the layer represents the devices and entities the architecture 202 needs to interact with. For example, sensors 206, beacons 208, user devices 210, and other entities 212. The system needs to be able to interact with these entities, as described herein, in order to provide the desired services.

Beacons 208 and user devices 210 have been previously discussed. However, the system can also interact with other entities such as sensors 206. For example, rather than providing access to the location based services through beacons, a different sensor can provide access. For example, if a user must swipe a key card to enter a particular building, the system can use the swipe of the key card to initiate providing services. Consider the following scenario. Suppose a user's key card is tied to a particular user device or particular set of user devices. As a user swipes the key card, the sensor can send the information to the location based services 110. The location based services can then look up the associated user devices and see which are located in the same area as the received sensor reading. For example, a user device 114 may be on a local area network in the same building as the key card swipe came from.

Based on this information, the location based services 110 can proactively contact the user device 114 and provide access to services at the location of the key card swipe. In this instance the key card swipe may be utilized as a response to an authentication challenge (although no formal challenge was issued to the user device 114) and the system can simply provide access to a designated set of services. Alternatively, the location based services 110 can issue an additional authentication challenge, such as an authentication challenge described elsewhere.

As a user enters the building and swipes his card, the user can be presented with services that are provided for the building. Once such service can be a mapping service that shows a map of the building. A user can enter (i.e. via touch, voice, selection, etc.) a desired destination and the service can provide information on the location, a map and/or directions to the location, and/or other mapping type applications. For example, a user may request information on the teams located in the building, information regarding a person in the building, a request as to where a person is, where the person's office is, directions to any of the foregoing, and/or so forth.

Any other of the services and/or scenarios can similarly be triggered by one or more sensors as an alternative to, or in addition to, beacons. Sensors are like a beacon in that they are tied to a particular location and thus can be used to access location based services. Sensors include electronic sensors that provide visual information (i.e., facial or other recognition), biometric information, electronic scanning (such as a key card, a link from a user device, and so forth), or any other sensors.

The adaptation layer 214 provides a layer where adaptors, drivers, converters, etc. reside that convert any particular vendor and/or entity specific data, protocols, data formats, data types, etc. into information that can be understood by overall architecture 202. For example, data coming from a particular beacon, sensor or other physical layer 204 entity may have data formatted in a way that needs to be converted in order to be used by the overall architecture 202. Thus, a particular vendor's beacons may have a particular set of data stored in a particular way and a different vendor's beacons may have a slightly different set of data stored in a slightly different way. Both can be converted by appropriate converters in the adaptation layer 214 into the standard format and data structure used by the infrastructure as it comes from the various beacons.

The modular nature of the layer allows adaptors, converters, drivers, and so forth to be added as they are needed and removed when they are no longer needed. Thus, the adaptation layer 214 can be evolve to accommodate technology as it changes. In FIG. 2 the adaptation layer 214 comprises sensor adaptors 216, beacon adaptors 218 and other adaptors 220. These are representative of the appropriate adaptors to communicate with the devices in the physical layer 204.

The dynamic status updater and device management layer 220 (hereinafter status and management layer) performs several functions. The status and management layer 220 can update information from and about the sensors, beacons, devices, and other entities that are known by the architecture by retrieving data such as location data, health data, data to be logged from the devices in the physical layer, and so forth. Such information can be pulled form sensors, beacons, user devices, etc. on a periodic and/or aperiodic basis. Thus a schedule can be established and/or events that occur can drive the data being pulled from the entities of the physical layer 204.

The management aspect of status and management layer 220 can provide information such as turning beacons and other entities on/off, adding/removing physical layer entities, setting/changing identifiers (like beacon identifiers), implementing other management functions provided by the management portal 234/104 and so forth.

Status and management layer 220 can also be used to implement authorization challenges as described herein and/or authorization challenges can be implanted in different layers and/or by different systems as discussed herein.

To accomplish the described functions, the status and management layer 214 may work in conjunction with higher level layers (i.e., management portal 234, applications 232, and/or other systems).

An API set can be provided on the lower levels that allows the upper levels, such as location based service (LBS) layer 228, management console 234, applications 232, and so forth to take advantage of the functionality provided by the underlying layers. These APIs can be accessed by programmers, for example, through a software development kit (SDK) 226. The inclusion of the SDK 226 in the layers of the overall architecture 202 is not meant to illustrate that the SDK 226 represents a separate layer that the upper layers (e.g., LBS layer 228, applications 232, management console 234, etc.) must utilize. It can, however, represent the APIs provided to access the functionality of the underlying layers.

The LBS store 224 is illustrated off to the side, but it can also be part of the overall architecture 202. The LBS store 224 is designed to represent storage of the information that the overall architecture 202 knows about the physical layer 204 devices, along with the information associated with those devices (e.g., location, IDs, power status, etc.) As previously discussed, the status and management layer 220 can retrieve and/or log information about the physical layer 204 devices. This information can be stored in the LBS store 224 so that the relevant information can be retrieved and utilized by the various layers, the management console, LBS service layer, applications 232, etc. The information in the LBS store 224 can be maintained by the status and management layer 220, by a separate service (not shown), by other layers/applications/services, or any combination thereof. Representative information kept as part of the LBS store 224 is illustrated and discussed in conjunction FIG. 3 below.

Upper level services, functions, and so forth can utilize the lower layers to provide the functionality discussed in conjunction with embodiments discussed herein. For example, the management portal 234 can implement the functions discussed in conjunction with management portal 104 of FIG. 1. The beacon identifier mapping, management and so forth can be implemented by interacting with the functions provided by the status and management layer 220 and the information stored in LBS graph 224.

The LBS service layer 226 represents the services provided by the overall architecture 202. This can include, for example, connections to other cloud services that are discussed herein (e.g., cloud services 116), the location based services (e.g., location based services 110), and so forth. Thus LBS service layer 226 is on option to implement various services such as the authentication challenges described herein. LBS service layer 228 can also provide services that other services and applications can build upon. As a representative example, one of the scenarios discussed herein is a helpdesk service. This can be implemented via a chat service with a live person, or can be implemented using chatbot technology, such as might be provided by a digital assistant 230 or other such service. Thus, a user may authenticate into location based services 110 and one of the services being offered may be implemented in conjunction with or by a digital assistant 230. Thus the user may interact with the location based services 110 and ask things like "give me directions to my next meeting" or "what errands can I run while I'm here." These can be implemented using location based services 110 that rely on LBS layer 226 and a digital assistant 230 (e.g., cloud services 116).

Finally, applications 232 represent other services and/or applications that are built upon/as part of the infrastructure. For example, a subscriber may desire to have custom location based services 110 that can be implemented and deployed (e.g., through the management portal) as part of the overall architecture 202.

Figure 3:
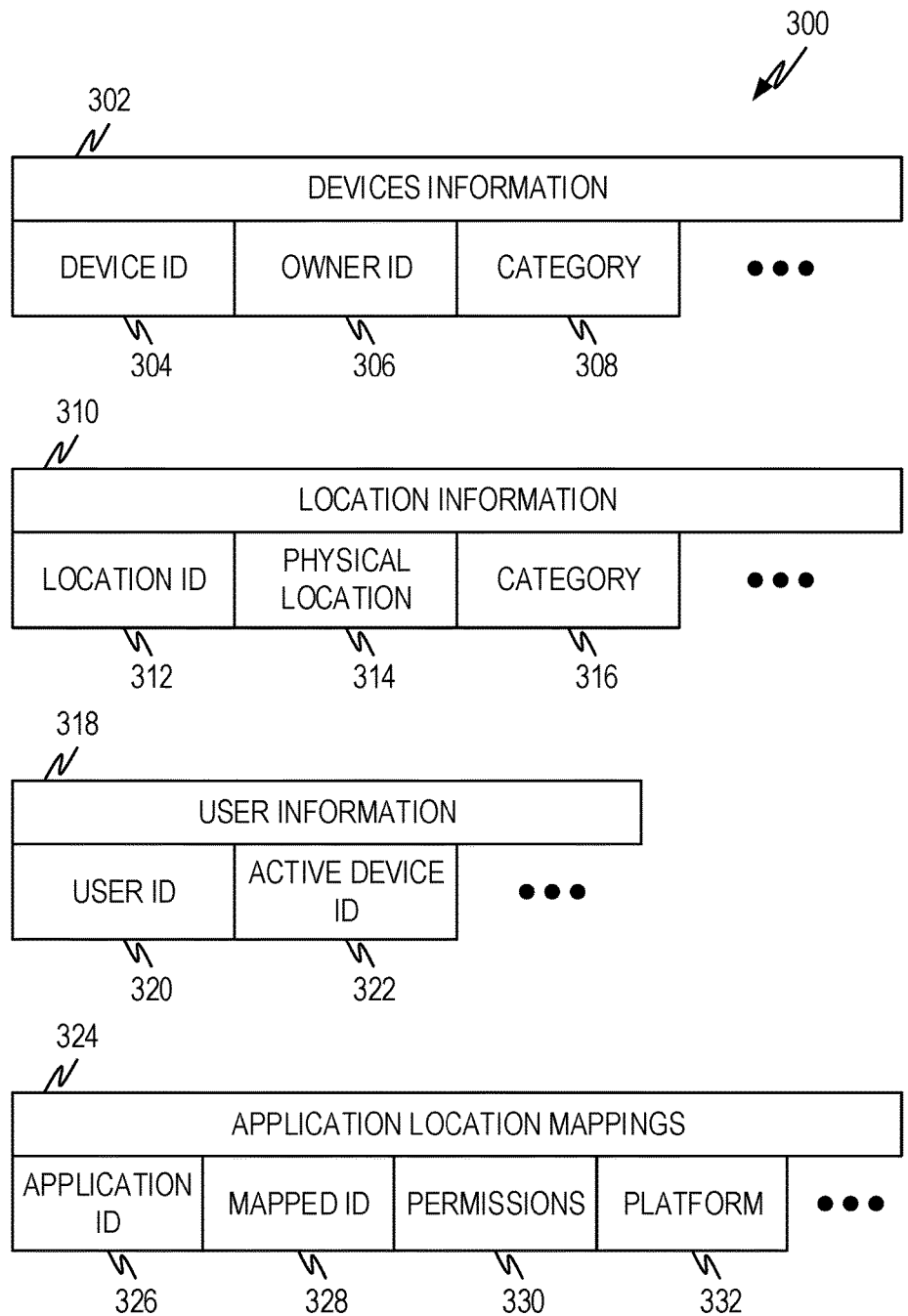
FIG. 3 illustrates example data structures utilized by embodiments herein.

FIG. 3 illustrates example data structures 300 utilized by embodiments herein, such as those stored as part of LBS store 224. The representative data structures indicate how devices, physical locations (e.g., rooms), user information, mappings, and so forth can be stored and represented in an example embodiment. The data structures herein can be tables, objects, or other data structures that store the representative information.

Devices can be represented by devices structure 302, which contains fields such as a device identifier 204, an owner identifier 306, a category 308 and so forth (as illustrated by the ellipses). The device ID can be an identifier assigned to the device, such as beacon ID for beacons, a network address, or any other type of ID that identifies the device. The owner ID identifies the owner of the device. For example, where beacons employed can be owned by the service provider, subscriber or someone else, the owner ID can identify that owner. Furthermore, the devices information may also contain permissions (not shown) such as who can map the beacon to applications, in the case of a beacon. The category 308 indicates the type of device such as a beacon, sensor, user device, and so forth.

Locations can be represented by the location information data structure 310. Locations can be identified by a location identifier 312, a physical location 314, a category 316 and other fields. The location identifier 312 is a unique identifier assigned in the system to identify the location. The physical location 314 is a field that describes the physical location in absolute and/or relative terms. Thus a physical location can be identified by a latitude/longitude coordinates, a relative description (the executive conference room on floor 12), or any combination thereof (room 318 of building 12). The category 316 is a category, subcategory, etc. that describes what is at the physical location. Thus representative categories may be conference room, office, auditorium, hotel room, restaurant, building, corridor, or any other category/subcategory that adequately describes the location, its function and/or so forth.

User information can be stored in user information data structure 318. Thus, users may have one or more user IDs 320, one or more device IDs 322 that are associated with the user, authentication credentials (not shown), and/or other information. The user ID 320 identifies the user and may form part of the authentication credentials. The user ID 320 can be any identifier or combination of identifiers. The device IDs 322 may identify devices that have been registered as being associated with the user or may identify a particular device that the user used to respond to the authentication challenge and thus is the user device (i.e., 114) or combination of user devices that the user is currently using to access the location based services.

Application mappings, location mappings, and so forth can be stored in application location mapping data structure 324. This data structure can include an application ID 326, one or more mapped identifiers 328, permissions 330, one or more platforms 332, as well as other fields such as an authentication type/identifier that is needed to access the application and so forth. In the description of this data structure, application encompasses both applications and services. Thus data structure 324 could have been termed a service mapping data structure. Thus the application ID 326 identifies the application(s) and/or service(s) that are being tied to the particular device(s), location(s) and/or user(s) indicated by the identifier 328. Location and/or device ID 328 is the identifier of one or more locations and/or devices (sensors, beacons, etc.) that are being mapped to the applications/services. Permissions 330 identify permissions associated with this mapping and can include, for example, policies discussed as well as the authentication type/authentication requirements that a user needs to present in order to gain access to the mapped applications/services. In addition, the permissions field 330 may include a link to an authentication service that should be used to validate authentication credentials presented as part of the authentication challenge(s).

Other data structures may also be part of the LBS data store such as the information discussed above. Furthermore, all the fields indicated as single can also be plural instances. So multiple identifiers of services, users, devices, and so forth can utilized. For example, a user can have multiple identifiers 320, multiple devices 322. A mapping can map multiple applications/services 326 to multiple location, devices, users, etc. 328, and so forth.

Figure 4:
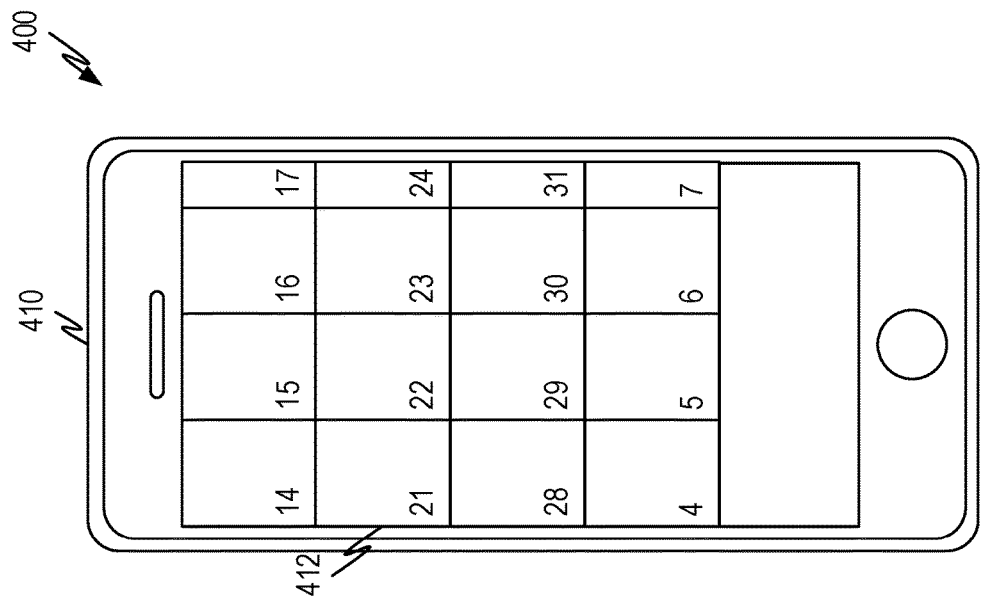
FIG. 4 illustrates an example secure location based services provided to end users.
Figure 4:
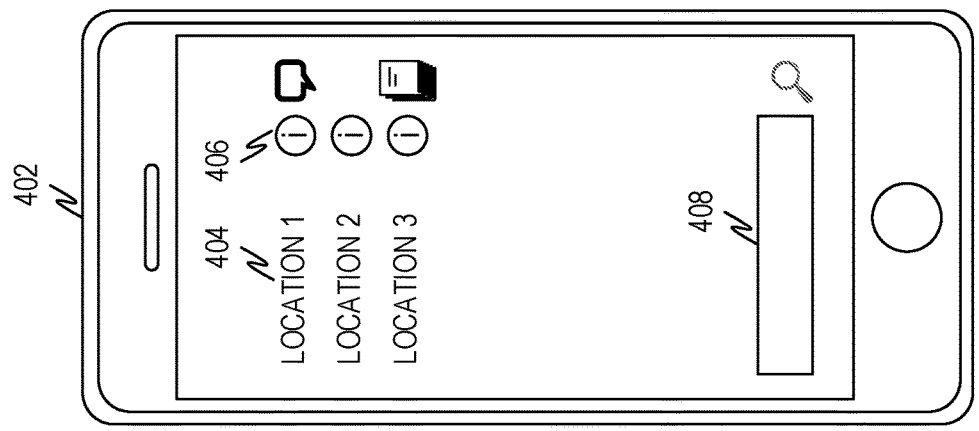

FIG. 4 illustrates an example secure location based services 400 provided to end users. For example, when a user walks by a beacon, the user may be presented with a list of available services, possibly along with the locations where the service can be utilized. Thus 402 represents one way a user can discover the services that are available at the particular geographic locations. The screen illustrated in 402 can arise in a variety of contexts. In one example, a user can perform a search using a search engine, digital assistant, and so forth and the search results can indicate any location based services at that location. In this context, the list 404 can represent the list of returned search results along with icons 406 indicating what services are available. Thus the circle 'i' icon can represent that information helpdesk service is available. The chat bubble can represent a chat service. The stacked documents can represent a document sharing service, and so forth.

In a separate context, the screen 402 may be shown once a user authenticates at a particular location, as described herein. In that context, the list 404/icons 406 may simply list the services available at the particular location where the user is now that the user has authenticated, may list nearby services available now that the user has authenticated, and/or any combination thereof.

Search box 408 illustrates that in some embodiments, like the search result example above, the user may be able to search for desired services and/or locations. Although the search box may be more associated with text input, searching may also be accomplished by voice, selection, touch, inference, and so forth.

Screen 410 illustrates that once a user has authenticated (in the case of private services), a particular service may be presented automatically (i.e., without user selection) in some instances or may be presented in response to user selection (i.e., from a discovery screen like 402). Representative location based use scenarios are presented below.

The following represent example use scenarios that are enabled by the architectures, systems, methods, and so forth described herein. They are presented here to allow a more concrete understanding of how the disclosure enables various new and unique scenarios.

In a first scenario a subscriber 102 desires to provide information useful to a set of customers or potential customers. In this scenario, the subscriber is a movie theater and has subscribed to a cloud based calendar service. The subscriber utilizes the cloud based calendar service to track the current and upcoming movies that are/will be shown at the theater as well as show times, prices, and other such information. The subscriber acquires various beacons or utilizes beacons located in geographic areas where users that may be interested in the information are likely to frequent. Thus, if the theater is in proximity to restaurants, businesses, and so forth beacons can be located at those locations. Furthermore, the subscriber desires the information to be made available only to those members of their valued customer program.

The subscriber 102 would log onto the management portal 104 and locate the appropriate beacons along with their beacon identifiers. The subscriber 102 would then assign the appropriate beacon identifiers their calendar application. The subscriber 102 would then identify a type of authentication as well as a list of authorized users and authentication credentials (i.e., information to allow the location based services 110 to validate the response to the authentication challenge). Alternatively, the subscriber 102 could direct the location based services 110 to pass received credentials received in response to the authentication challenge to their own servers for validation. Finally, the subscriber 102 may indicate which information in the subscribed calendar service should be shared with those users. Additional configuration parameters can be included, such as whether the user can discover which services are available before or after authentication, how long the location based service should be associated with the beacon IDs, and so forth.

As a user comes into physical proximity of one of the beacons, the user device 114 acquires the beacon ID from beacon 108 and the daemon 124 sends the beacon ID to the location based services 110 over the network 112. The location based services 110 responds with the appropriate authentication challenge and the user utilizes the user device 114 to respond to the authentication challenge. Thus, if the authentication challenge is single-factor authentication, such as a username/password, the user would provide her username/password (through whatever mechanism) in response to the challenge.

The location based services 110 can then validate the response to the authentication challenge, either based on known information, by sending the response to another system for validation, or any combination thereof. Once the location based services 110 validate the response to the authentication challenge, the location based services can respond with 1) a list of services that can be accessed at that location, 2) permissions to access the service, 3) be granted access to the authorized services, and/or 4) combinations thereof. In a representative example, the location based services 110 responds with the portion of the shared calendar. In addition, the user may be given further options, such as to overlay their personal calendar on the screen, select a particular item for further information, purchase tickets, and so forth.

In a second scenario, multiple services can be assigned to the same beacon ID. Thus, if the beacon in the above scenario is located in the city offices, the city may also assign the services they wish to provide to the user to the same beacon ID. That way when the user authenticates to the location based services 110, the location based services can provide all the services available to the user at that location, independent of whether they come from the same subscriber or different subscribers.

Note that in some embodiments, the city can assign services without the movie theater needing to consent (or vice versa) to the duplicate assignment. In other embodiments, the service provider 116 may institute policies that specify how and when duplicate assignments can be made by independent subscribers. Thus, the number of services may be limited, or the types of services may be limited, or the services may be limited to a single subscriber (or group of subscribers), or services being combined may be limited to those using the same method of authentication, etc. Such policies can set any desired limitation or combination of limitations on the ability of subscribers to assign duplicate assignments.

In another scenario, a company desires to provide services to those attending a conference, a meeting, or other such gathering (hereinafter, collectively meeting). Beacons can be located in proximity to the meeting or in proximity to the route individuals would travel to attend the meeting. As the user device 114 passes the beacon 108, the device 114 acquires the beacon ID from the beacon 108. As before the beacon ID is sent to the location based services 110 over the network 112 and the location based services 110 issues the appropriate authentication challenge.

In this scenario, consider two different types of meetings. The first type of meeting is a meeting held in a secure location, such as in a building with controlled access (through key cards, guards, etc.) where the identity of users are checked for authorized access upon entering. In this context, the subscriber may choose to rely on the fact that only authorized individuals are in the proximity to the meeting. The second type of meeting is one held in a non-secure location where individuals in proximity to the meeting may be authorized or not authorized for the content of the meeting. In the first type of meeting, the subscriber may choose to use authentication that takes into account the controlled access of facilities where the meeting is held. In this instance, individuals in proximity to the meeting may be "authorized" to hear the content (e.g., they can hear company confidential information) but are simply not invited to the meeting. Thus a subscriber may choose to rely on a relatively less secure form of authentication. In a representative example, the user can be asked to provide a username or some other identifier (badge number, email alias, etc.) as part of the authentication challenge. The location based services 110 can check the provided user identifier against a list of invitees and if the user is on the list, provide the user access to the specified services.

In the second type of meeting, the subscriber may opt for a relatively more secure method of authentication. For example, the subscriber can choose to require two factor authentication, biometric information, or any other such authentication.

In the meeting scenario, the services that can be provided can include a wide variety of services useful in a meeting type scenario. The following are provided by way of example only. One service that can be provided is access to meeting materials. Thus, as a user is authenticated, the slides and/or other materials for the meeting can be provided to the user either as part of a shared document (i.e., through a document sharing service, a document collaboration service, etc.) or for download. In another example, before providing access to the meeting materials, a user may be required to accept particular terms. For example, the location based services 110 can present a non-disclosure agreement that a user is required to read and accept before the meeting materials are proved. Thus, services can be linked together to provide different user scenarios.

Another service that could be provided is collaboration on shared documents, screens, and so forth. Thus authenticated users can be provided access to a shared meeting notes document where each can note their assigned action items or place their observations, etc. Once the meeting ends, the shared note document can be made available to attendees.

Another type of collaboration service that can be provided is screen sharing. For example, if a meeting location did not provide the ability to project content onto a large screen that everyone could see, the content could be projected to users on their user devices. Additionally, users may be required to sign an agreement, accept terms and conditions, etc. prior to seeing the shared content.

In yet another scenario, authorized users may be provided access to a chat and/or other communication service that can be used during the meeting to have conversations through chat or other communication. An advantage of tying the service to the meeting is that the location based services 110 can handle the communications in accordance with policies for the meeting. For example, users may be able to communicate with others in the meeting, but not communicate with users of the same chat/communication service that are not attending the meeting. This may be accomplished by the service keeping track of the intended recipient and checking to see whether the intended recipient is in attendance at the meeting or not and filtering the attempted communications appropriately. Retention policies to communications (and/or documents shared) during the meeting can also be applied (i.e., communications are/are not kept after the meeting terminates and/or after a particular time frame, etc.).

As can be seen from the above scenarios, productivity and other cloud services can be tied to a particular location and/or event. Furthermore, the conditions under which the productivity and other cloud services are accessed, how the productivity and other cloud services are utilized, and so forth can be configured appropriately. This provides new and unique combinations of services that can be provided without an individual subscriber being required to either create and/or maintain their own services. Furthermore, such services can be easily configured and reconfigured to meet the demands of various use scenarios. Thus, a user may identify some meetings that have one set of services and/or restrictions and other meetings that have different set of services and/or restrictions.

Figure 5:
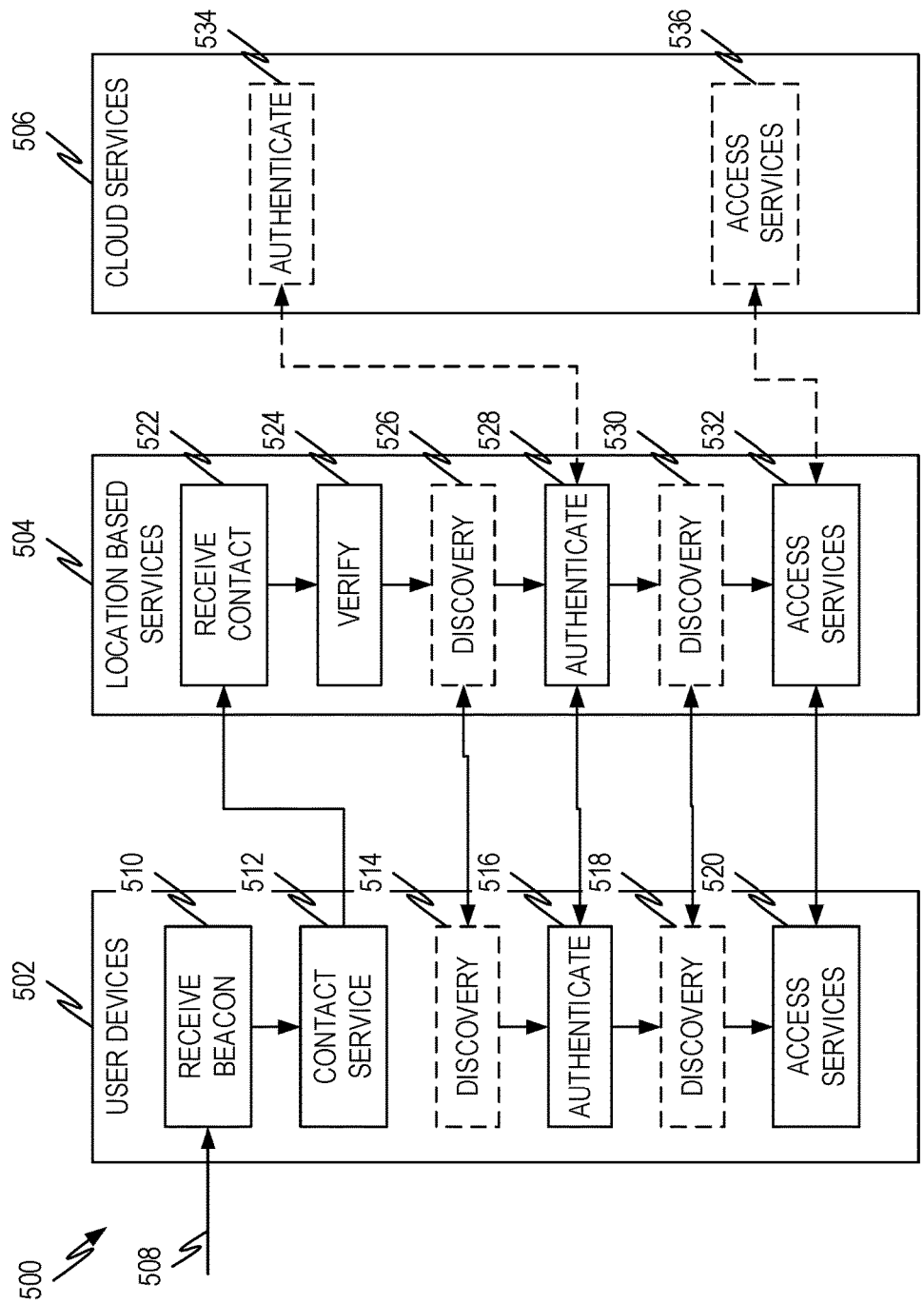
FIG. 5 illustrates an example flow diagram for providing secure location based services.

FIG. 5 illustrates an example flow diagram 500 for providing secure location based services. The flow diagram 500 does not discuss initial management and configuration of the location based services, which have been previously described. Thus, the location based services are mapped to beacon IDs, locations, etc. by a subscribe as previously discussed. The flow diagram 500 centers on the how a user and user device interacts with the location based services to gain access to the services. Illustrated in FIG. 5 are user device(s) 502, location based services 504 and cloud services 506, which may correspond to corresponding items in other figures herein. Thus user device 502 can correspond to user device 114 of FIG. 1 and so forth.

In operation 510, the user device 502 receives a beacon ID 508. In some embodiments in addition to a beacon ID, or in lieu of a beacon ID, the user device may receive other information from sensors, and/or other devices. For example, in discussing authentication below, one option described utilizes information retrieved from a physical device, such as an employee ID card. If the employee ID card has an RFID chip and the user device is able to read the information on an RFID chip, the user device may retrieve the information on the employee ID card and utilize it as part of the authentication process as discussed below. Furthermore, if the user device 502 cannot read the information on an employee ID card, for example, the user device 502 can receive the information from a sensor and/or device that can read such information.

In yet a further example, the authentication scheme may require the user device 502 to send GPS data indicating the location of the user device along with the beacon ID, and/or other information as discussed below.

In operation 512, the user device 502 contacts the location based service 504. This may be performed, for example, by a hub application 122 and/or a daemon 124 as previously discussed. In some instances, the user device 502 may use the beacon ID, and/or other information to identify how to contact the location based services 504. For example, a mapping table can be kept that provides contact information (network address, etc.) for the location based services 504 based on the beacon ID and/or other information. The mapping table can also identify auxiliary information such as GPS data that should be provided along with the beacon ID.

In operation 522, the location based services 504 receives the beacon ID and any auxiliary information. The beacon ID and/or auxiliary information are verified in operation 524. For example, the verification operation can check to ensure the beacon ID is valid and has been mapped to one or more services. The verification operation 524 can also verify that the GPS data matches the location information associated with the beacon having the returned beacon ID, with an appropriate threshold. For example, if the beacon is located at a particular geographic location and the beacon signal reaches to a particular range, the GPS data can be evaluated to see if it falls within the signal range, accounting for GPS measurement error, error introduced by a moving user device (i.e., the user is walking, etc.), other error sources, and/or combinations thereof.

Once the initial received information is verified (operation 524), the location based services 504 can respond with information showing what services are available (operation 626) or may issue an authentication challenge (528) either before or after presenting the discovery information. In other words, the discovery information is optional in some embodiments and may not be presented at all. If it is presented, it may be presented before (operation 526) authentication (operation 528) or after (operation 530) authentication (operation 528) as discussed elsewhere.

Authentication can be one over several types of authentication challenges and can comprise authentication challenges that are more secure or authentication challenges that are less secure, depending on the context, use scenario, and so forth as previously described. For example, a subscriber may require two factor authentication in situations where more secure authentication is desired. Two factor authentication takes many different forms and typically consists of something a user knows (like a username/password combination, secret number, key, and so forth) and something a user has (a key card, a mobile device, a synchronized random number generator, biometric reading, and so forth). In other instances, the subscriber may opt for single factor authentication, such as a username/password, a biometric reading, and so forth. In still further instances, a subscriber may opt for a low security authentication. As previously described, where a secure environment exists (i.e., controlled access to a physical location), it may be sufficient to simply check a provided username, user ID, and/or so forth with a list of authorized users, attendees, etc.

Authentication operations 528 and 516 represent the authentication challenge/response as well as authentication response validation (operation 526). Thus, the location based services 504 can identify the type of authentication that should be used (i.e., from the appropriate application location mapping data structure 324) and issue the appropriate challenge. As a user provides the authentication challenge response (operation 516), the response can be validated by the location based services 504, if the subscriber and/or cloud service has provided the appropriate information that allows the location based services to validate the challenge response. Alternatively, the authentication challenge response can be forwarded to another system for validation. In FIG. 5, an option to forward the authentication challenge response to the cloud services 506 for validation is illustrated in operation 534. However, the authentication challenge response can also be forward to a system controlled by the subscriber, or to some other third party authentication validation service. When authentication challenge response are forwarded to other systems for validation, they can be forwarded in a manner that minimizes security risks like a man in the middle attack, replay attacks, and so forth. There are numerous ways to do this including encrypting the information in the challenge response in a manner that allows the authentication validation service to decrypt it, opening a secure connection (i.e., using TLS) to the authentication validation service, transferring the information over a secure network to the authentication validation service, and so forth.

One the user has been verified (i.e., by validating the authentication challenge response), the user can be granted access to the provided and/or requested services as illustrated in operations 520 and/or 532. As previously discussed, the location based services may rely on and/or act as an intermediary for cloud services 506, as illustrated in operation 536. Additionally, or alternatively, the location based services 504 may provide information (a token, access credentials, a network location, etc.) to the user device 502 that allows the cloud services 506 to be accessed by the user devices 502.

Figure 6:
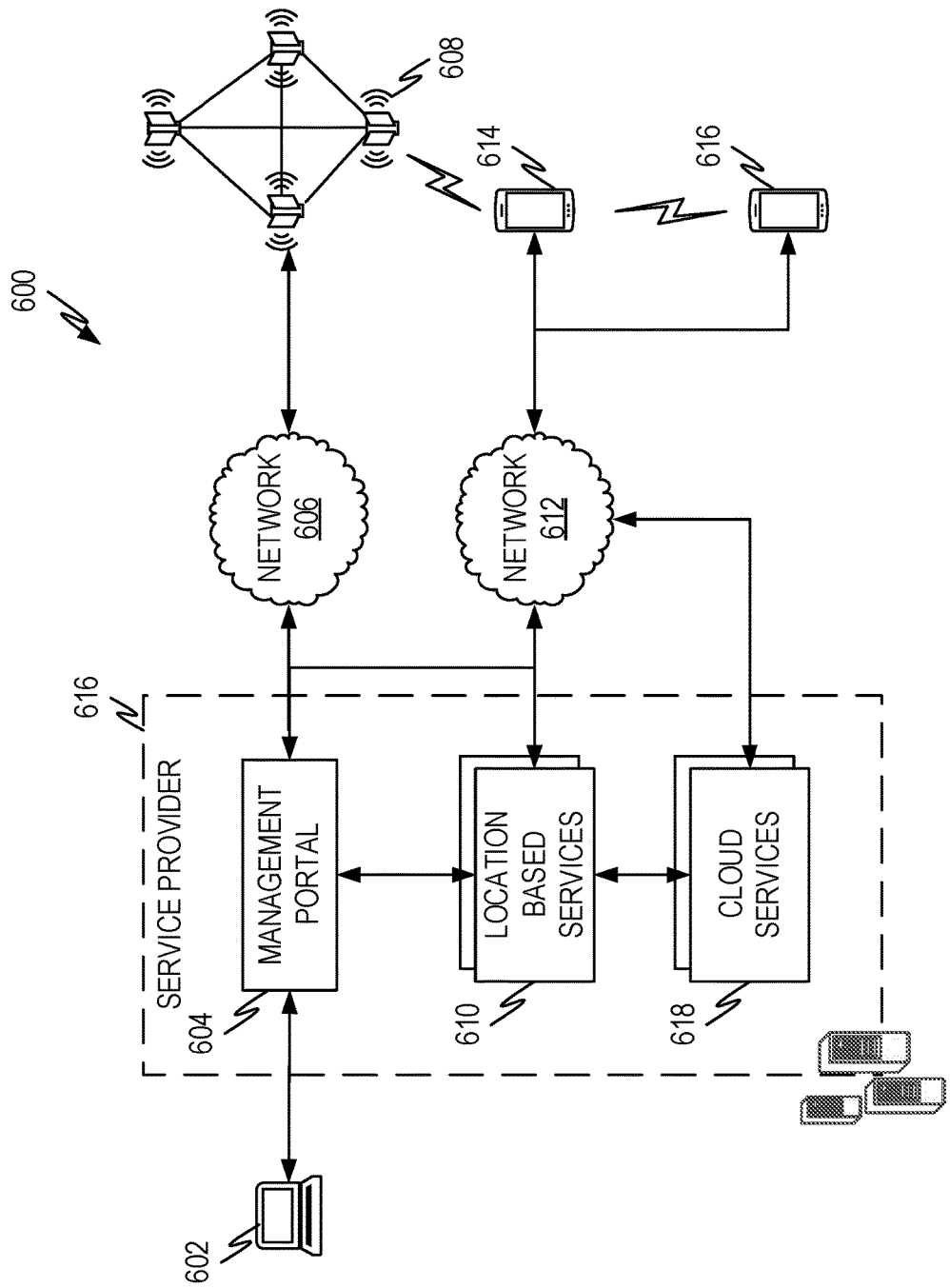
FIG. 6 illustrates another example architecture of a system to provide secure location based services.

FIG. 6 illustrates another example architecture 600 of a system to provide secure location based services. This architecture is substantially similar to the architecture of FIG. 1 and the similarly named components operate as described therein. This subscriber 602 operates like subscriber 102, service provider 616 operates like service provider 126, and so forth. User device 614 operates like user device 114, with some differences which will be described. In the architecture of FIG. 6, user device 614 can act as a beacon, such as beacon 608. Thus, user device 614 can implement Bluetooth LE, Bluetooth 4.1 or some other short range wireless standard that allows other user devices (i.e., user device 616) to obtain a beacon ID from user device 614. This can be utilized, for example, where location based services are not tied to a geographic location but tied to a user device. Additionally, or alternatively, the location based services can be tied to a combination of geographic location and user device.

Consider the meeting scenarios described previously. A meeting organizer or meeting leader can be set up as a beacon for the meeting. Thus, as people arrive at the meeting, no materials are distributed until the meeting leader arrives, at which time user devices present at the meeting can get a beacon ID from the meeting leader's device and authenticate into the location based services. In an alternative scenario, the users attending the meeting can authenticate into the meeting using a beacon ID from a beacon located in the meeting room, etc. but access to the service still requires the presence of the meeting leader. Once the meeting leader arrives, the other user devices can acquire the beacon ID from the meeting leader's device and send it to the location based services as evidence that not only have they authenticated into the meeting but the leader is also present. On the location based service end, the location based service can receive the beacon ID that is supposedly from the leader's device and compare it to the beacon ID assigned to the leader's device (i.e., device ID 304), and/or check to see if the leader has authenticated into the location based services. If one or both of the conditions are met, the location based services can grant access to the services, such as download the meeting materials, present an NDA, and/or other services as described herein.

In alternative scenarios, the scenarios of described herein can simply use the beacon ID provided by one or more user devices to access the services in the scenarios described. For example, users can form impromptu organizations and/or groups of authenticated users that access location based services. For example, at a conference, a study group, or some other venue a group of users want to form a collaboration group to work on something. In this case, one or more of the user devices can have been configured (see below) to act as a beacon for accessing location based services. The users that form the group obtain the beacon ID from the authorized device(s) and authenticate as described herein. As the same beacon ID(s) is used to authenticate into the group, the group can form a closed group to access collaboration services such as the file sharing, screen sharing, and other location based services described herein.

Figure 7:
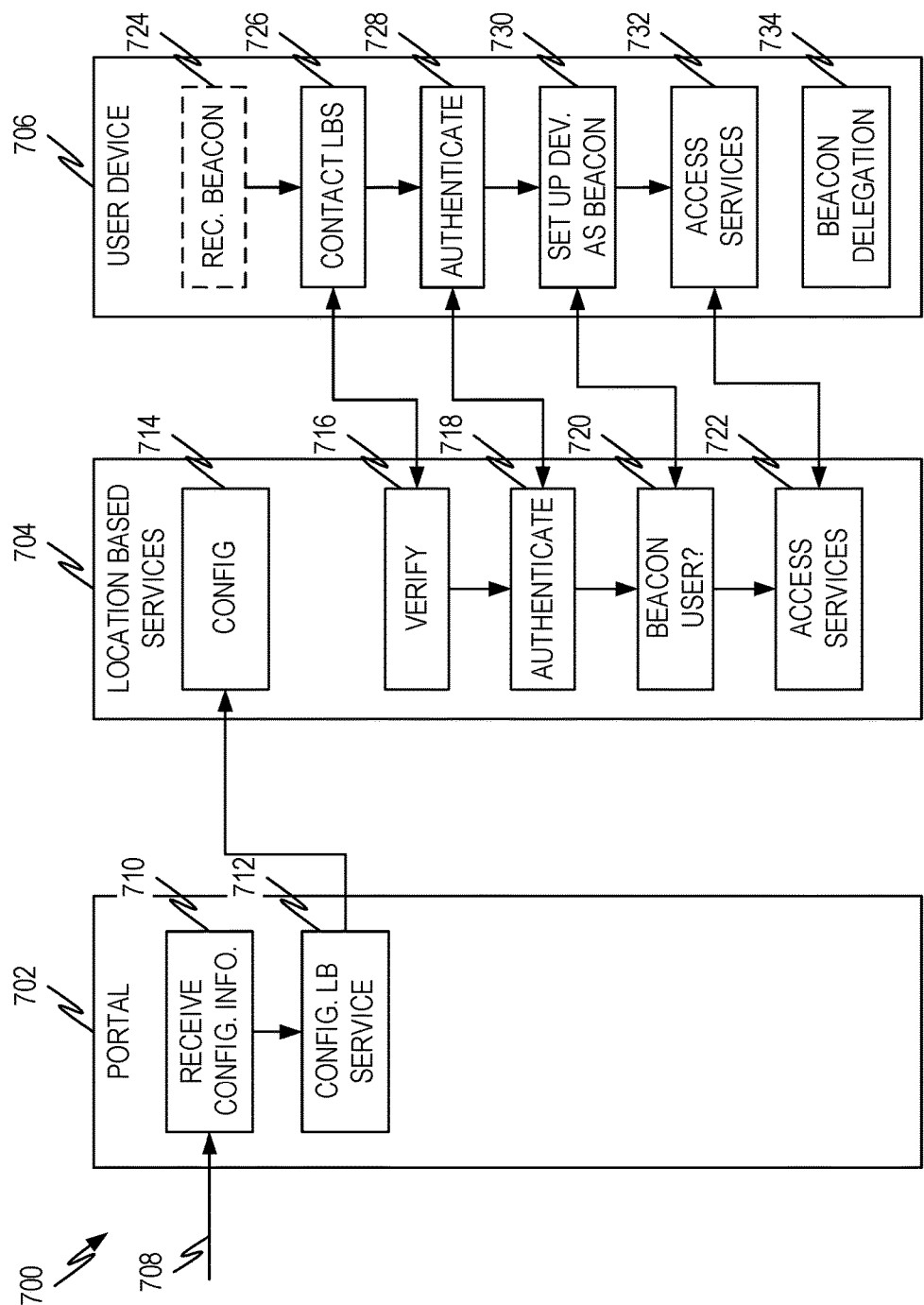
FIG. 7 illustrates an example flow diagram for a user device acting as a beacon to access location based services.

FIG. 7 illustrates an example flow diagram 700 for a user device acting as a beacon to access location based services, using an architecture such as the architecture of FIG. 6 where a user device acts as a beacon. The flow diagram 700 illustrates the interactions between a subscriber, the management portal 702, the location based services 704 and one or more user devices 706.

In operation 710 the management portal 702 receives configuration information from the subscriber, as illustrated by 708. In this instance the subscriber may either retrieve or create a beacon ID(s) for the user device(s) that will act as beacons for the service. Thus a subscriber may create a mapping between a physical beacon ID, beacon ID(s) associated with user device(s) that are acting as beacons for the service, the services that are to be accessed via the beacon ID(s), the authentication mechanism, and so forth as described above.

In operation 712 and operation 714 the appropriate configuration is performed, for example by creating the appropriate data structures in LBS store 224 and as previously described. Once the configuration is performed, then the appropriate combination of beacon IDs, authentication, and so forth will allow users to access the location based services.

When the location based services are to be accessed, such as at a meeting, at an ad hoc group organization, etc. the user device obtains the appropriate beacon IDs (operation 724) if required and sends them to the location based services 704 as indicated in operation 726. This can take the form of one of several different options. For example, if a meeting is keyed to a particular device used by the meeting leader (i.e., no services can be accessed until the beacon ID from the leader device is obtained), then the leader device may not need a beacon ID and my simply contact the location based services 704 using its own beacon ID. Other devices, however, will obtain the beacon ID from the leader device and contact the location based services using that beacon ID.

Upon receipt of the initial contact information comprising the beacon ID, along with any auxiliary information (GPS, user identifier, etc.) the location based services 704 verify the information in operation 716 as explained elsewhere in the disclosure. Upon verification of the initial information, the location based services 704 provides the authentication challenge and receives the authentication challenge response as previously described and as illustrated in operations 718 and 728. Also as previously described, the authentication challenge response can be validated at the location based services 704 or sent to another system and/or service for validation.

After the user is authenticated, the location based services 704 can configure the user device 706 to act as a beacon if the user device 706 is authorized to act as a beacon and if the user device 706 has not yet been configured with the appropriate beacon ID, etc. Thus, operation 720 identifies whether the authenticated user is a beacon user (i.e., the user's corresponding device is authorized to act as a beacon for the location based services) and whether the device has the appropriate beacon ID. If not, then the location based services 704 can transfer the appropriate beacon ID to the user device 706. Operation 730 represents the configuration performed by user device 706 (perhaps with input by the user) to configure the device as a beacon for the location based services.

If the user device 706 has not yet been set up as a beacon (i.e., does not have the appropriate beacon ID), the user device 706 can provide information in the initial contact that will signal to the location based services 704 that the device is authenticating without a beacon ID. In some embodiments this is achieved by providing a fixed beacon ID (all zeros, etc.) that signals no beacon ID is provided and/or auxiliary information that indicates the user device is attempting to be set up as a beacon. Once the user us authenticated (operations 718, 728) the location based services 704 can identify whether the user is authorized to be set up as a beacon. This can be achieved, for example by mapping a user identifier to a service rather than a device (if the device is unknown) or mapping a user identifier and a device identifier (which can be provided in the auxiliary information or as part of an authentication challenge) to a service, such as through data structure 324.

Properly authenticated users are allowed access to the location based services, cloud services, etc. as indicated in operations 722 and 732.

Operation 734 indicates that in some instances a user device acting as a beacon can delegate permissions to another device to act as a beacon. For example, in the scenarios previously described where a device acts as a beacon, there is a single "master" beacon device. Devices obtain the beacon ID from that device and then use that identifier to authenticate into the location based services. However, operation 734 indicates that a subscriber can grant the ability for the "master" device to delegate the authority to be a beacon to other devices. In some embodiments, this requires that the device to which the beacon authority is to be delegated has already had a user authenticate into the system. In other words, a master device acts as a beacon. The master device provides not only the beacon ID but information delegating the authority to be a beacon. This information is provided to the location based services 704 when the user authenticates into the system, either as part of the initial contact or as part of the authentication process. The location based services then configures the device as a beacon device as indicated in operation 720 and 730.

In some embodiments the subscriber can limit the permissions of a beacon device to grant beacon authority to further devices according to some criteria. For example, the subscriber can limit the number of devices that can act as a beacon, can limit the devices to devices used by select users (i.e., by title, role, users on a list or users not excluded from a list, combinations thereof, etc.). Thus, the beacon device may get information on who can be delegated the authority to act as a beacon and only delegate to those individuals, or can simply delegate the authority and allow the location based service to deny the beacon authority in appropriate circumstances.

The ability to delegate beacon authority as indicated in operation 734 creates scenarios with multiple masters, where users can authenticate into location based services using information from any beacon device. Also as previously explained, users may need to provide multiple beacon IDs before access is granted, such as the scenarios where a user has to authenticate in both with a geographically located beacon (i.e., a beacon in a meeting room) and a device beacon (i.e., the meeting leader beacon). The ability to have multiple masters also introduces the possibility of having "quorum" type voting where n of m approved masters have to be present before access to location based services is granted. In a representative example, an ad hoc gathering (i.e., no physical location beacon) may require two senior people to be in the group before access to certain documents or certain collaboration services is granted.

Example Data Center Architecture

Figure 8:
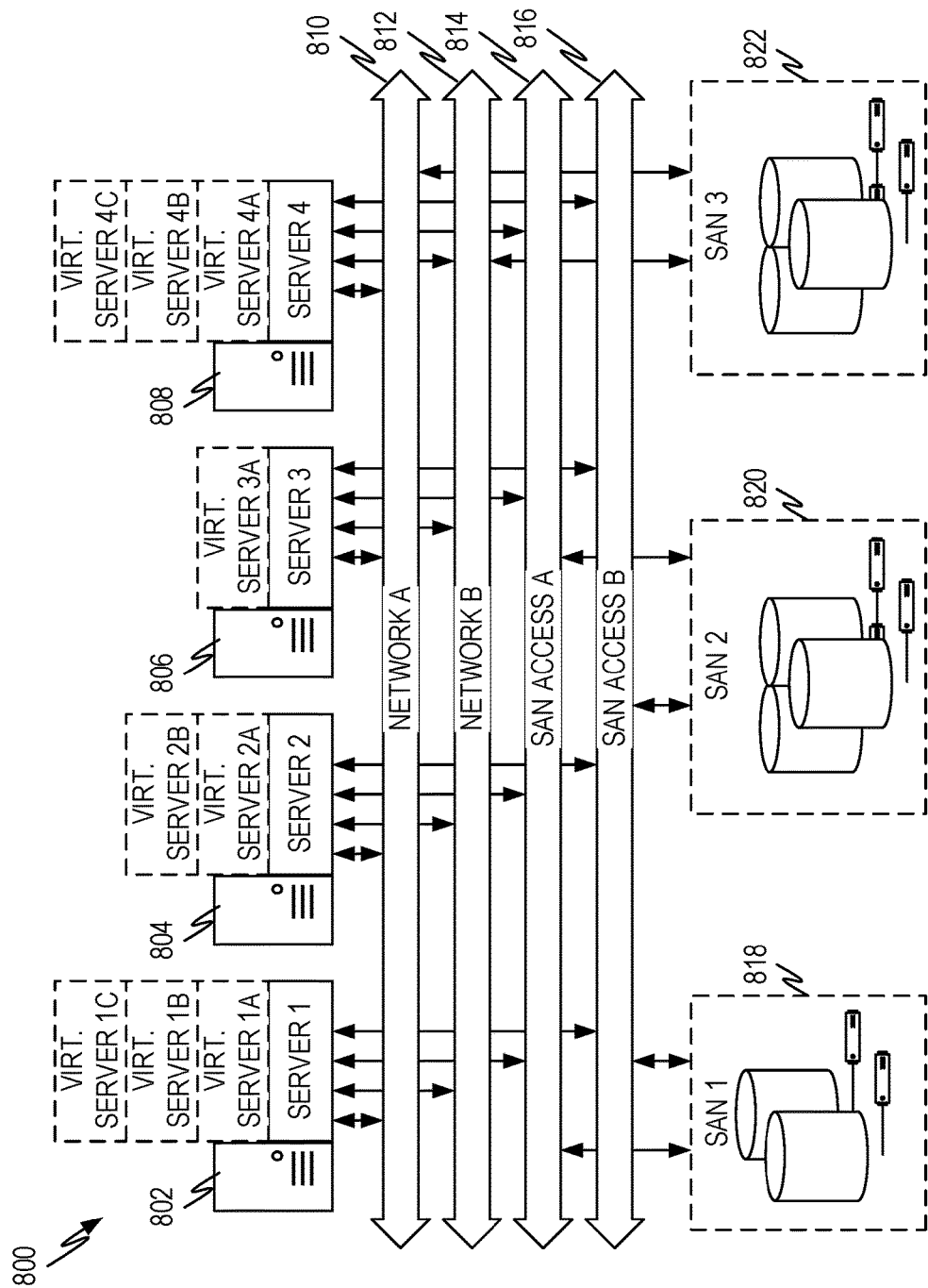
FIG. 8 illustrates representative data center suitable for providing location based services as described herein.

FIG. 8 illustrates representative data center 800 suitable for providing location based services as described herein. FIG. 8 illustrates a more hardware centric view of a data center and/or example cloud computing architecture. This hardware focused view and illustrates the resources underlying the more logical architecture of cloud computing often illustrated. A cloud computing architecture 800 typically has a plurality of servers or other systems 802, 804, 806, 808. These servers comprise a plurality of real and/or virtual servers. Thus the server 802 comprises server 1 along with virtual servers 1A, 1B, 1C and so forth.

The servers are connected to and/or interconnected by one or more networks such as network A 810 and/or network B 812. The servers are also connected to a plurality of storage devices, such as SAN 1 (818), SAN 2 (820) and SAN 3 (822). SANs are typically connected to the servers through a network such as SAN access A 814 and/or SAN access B 816.

A cloud computing architecture is typically characterized by scaling units that can scale in computing power (compute scale units), storage (storage scale units) and network access (network scale units). The compute scale units of a cloud computing architecture are typically some aspect of servers 802, 804, 806 and/or 808, like processors, memory and other hardware associated therewith. The network scale units of a cloud computing architecture typically include, or at least utilize the illustrated networks A (810) and B (812). The storage scale units typically include some aspect of SAN 1 (818), SAN 2 (820) and/or SAN 3 (822) like a disk unit, volume unit, an entire SAN, etc. A scale unit represents the smallest unit that can be used to expand and/or reduce the cloud computing architecture. Thus processors (compute scale units) are added or removed as a unit as are the other scale units.

Services and/or other implementation of the embodiments described herein will run on the servers and/or virtual servers and utilize the various hardware resources to implement the disclosed embodiments.

Example Machine Architecture and Machine-Readable Medium

Figure 9:
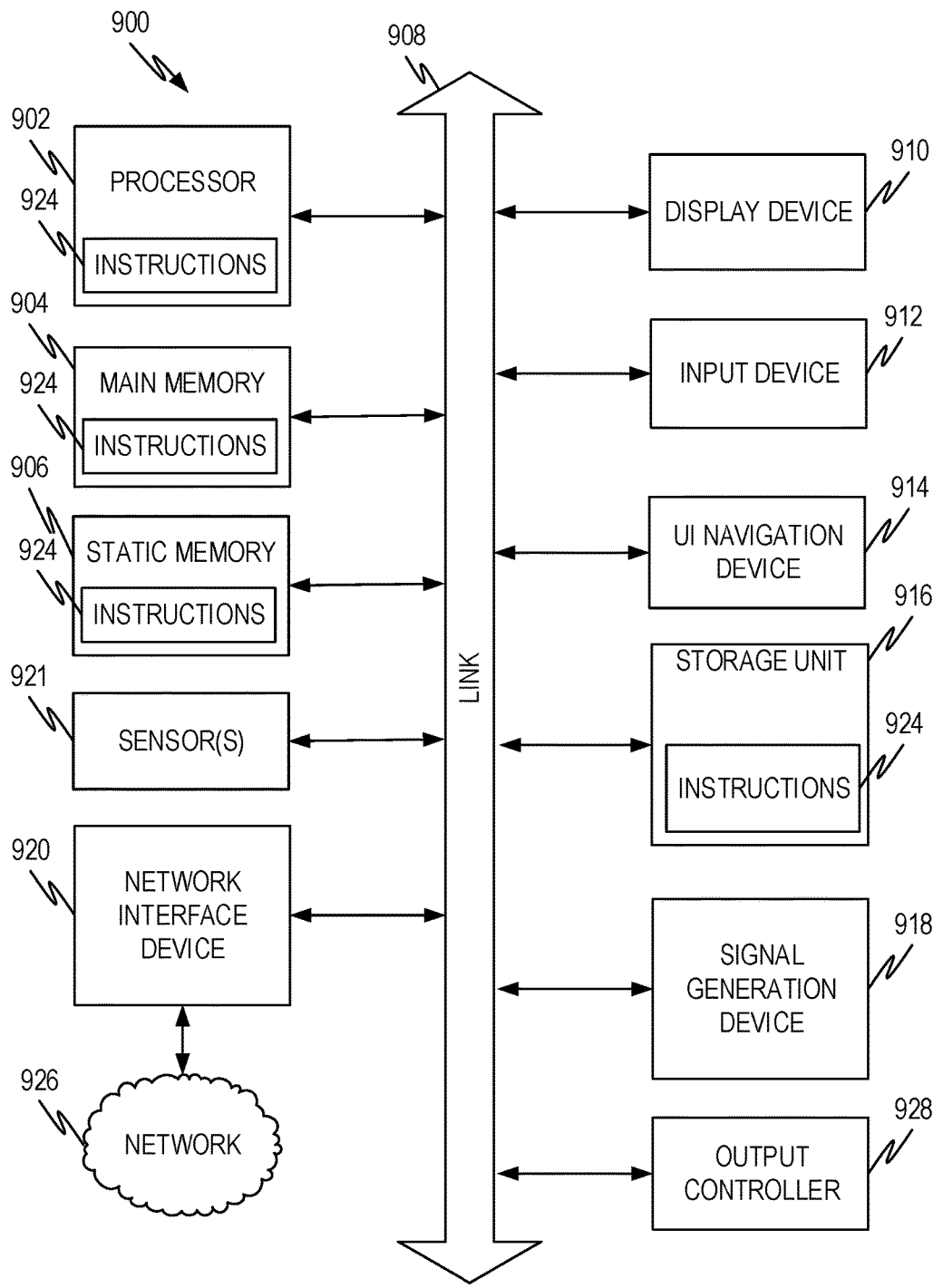
FIG. 9 illustrates a representative machine architecture suitable for implementing the systems and so forth or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless).

Executable Instructions and Machine-Readable Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-readable medium" and "computer-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media/computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for providing secure location based services comprising:

receiving, from a user device, a set of initial information comprising a beacon identifier;

identifying, based on the beacon identifier at least one associated service to be provided to a user of the user device;

sending to the user device, an authentication challenge;

receiving from the user device a response to the authentication challenge, the response to the authentication challenge allowing the user of the user device to be identified;

determining whether the response to the authentication challenge is valid;

responsive to the determination that the response to the authentication challenge is valid, providing access to the at least one associated service; and responsive to the determination that the response to the authentication challenge is not valid, denying access to the associated service.

Example 2

The method of example 1, wherein the set of initial information further comprises Global Positioning System (GPS) information obtained by the user device specifying the location of the user device.

Example 3

The method of example 1, wherein the beacon identifier comes from either a beacon device or another user device.

Example 4

The method of examples 1, 2 or 3, wherein after determining whether the response to the authentication challenge is valid, method further comprises providing a list of services to the user device that the user is authorized to access.

Example 5

The method of example 4, further comprising receiving an indication of an authorized service the user desires to access.

Example 6

The method of examples 1, 2 or 3 wherein the authentication challenge is based on at least one of:
the beacon identifier;
the at least one associated service; and
the location of the beacon associated with the beacon identifier.

Example 7

The method of examples 1, 2 or 3, wherein the set of initial information further comprises a user name or user identifier and wherein the method further comprises:

determining whether the user name or user identifier is on a list of approved user names or user identifiers associated with the beacon identifier; and responsive the determination that the user name or user identifier is on the list of approved user names or user identifiers, skipping the authentication challenge and providing access to the at least one associated service.

Example 8

The method of example 7, wherein the user name or user identifier is obtained from a physical device in proximity to the user device.

Example 9

A machine-readable medium having executable instructions encoded thereon, which, when executed by at least one processor of a machine, cause the machine to perform operations comprising:

receive, from a user device, a set of initial information comprising a beacon identifier;

identify, based on the beacon identifier at least one associated service to be provided to a user of the user device;

send to the user device, an authentication challenge;

receive from the user device a response to the authentication challenge, the response to the authentication challenge allowing the user of the user device to be identified;

determine whether the response to the authentication challenge is valid;

responsive to the determination that the response to the authentication challenge is valid, providing access to the at least one associated service; and responsive to the determination that the response to the authentication challenge is not valid, denying access to the associated service.

Example 10

The machine-readable medium of example 9, wherein the set of initial information further comprises Global Positioning System (GPS) information obtained by the user device specifying the location of the user device.

Example 11

The machine-readable medium of example 9, wherein the beacon identifier comes from either a beacon device or another user device.

Example 12

The machine-readable medium of example 9, wherein after determining whether the response to the authentication challenge is valid, method further comprises providing a list of services to the user device that the user is authorized to access.

Example 13

The machine-readable medium of example 12, further comprising receiving an indication of an authorized service the user desires to access.

Example 14

The machine-readable medium of example 9, wherein the authentication challenge is based on at least one of:
the beacon identifier;
the at least one associated service; and
a location of a beacon associated with the beacon identifier.

Example 15

The machine-readable medium of example 9, wherein the set of initial information further comprises a user name or user identifier and wherein the method further comprises:

determining whether the user name or user identifier is on a list of approved user names or user identifiers associated with the beacon identifier; and responsive to determining that the user name or user identifier is on the list of approved user names or user identifiers, skipping the authentication challenge and providing access to the at least one associated service.

Example 16

The machine-readable medium of examples 9, 10, 11, 12, 14 or 15, wherein the at least one associated service comprises at least one of:

a file sharing service allowing the user to share files, download files, or both share and download files;

a calendaring service providing access to either a calendar item associated with the user, a calendar item associated with the beacon identifier, or both a calendar item associated with a user and a calendar item associated with the beacon identifier;

a collaboration service allowing collaboration among at least a portion of users that have been granted access to the associated service;

a screen sharing service allowing screen sharing among at least a portion of users that have been granted access to the associated service;

a chat service allowing screen communication among at least a portion of users that have been granted access to the associated service;

a help service allowing the user to receive help from a chatbot, a person or both a chatbot and a person;

a mapping service allowing the user to see a map of the area surrounding a physical location associated with the beacon identifier; and a service listing showing services that are available and are associated with the beacon identifier.

Example 17

A computing system comprising:

a processor and executable instructions accessible on a machine-readable medium that, when executed, cause the system to perform operations comprising:

receive, from an administrator, configuration information for at least one cloud service, the configuration information comprising a set of users authorized to act as a beacon for the at least one cloud service;

receive, from a user device, a request associated with the at least one cloud service;

send to the user device, an authentication challenge;

receive from the user device a response to the authentication challenge, the response to the authentication challenge allowing a user of the user device to be identified;

determine whether the response to the authentication challenge is valid;

responsive to the determination that the response to the authentication challenge is valid:

determine whether the user of the user device is a member of the set of users authorized to act as a beacon for the at least one cloud service;

responsive to the determination that the user is a member of the set of users authorized to act as a beacon for the at least one cloud service, exchange information with the user device to place the user device into a state to act as a beacon for the at least one cloud service;

providing access to the at least one associated service; and responsive to the determination that the response to the authentication challenge is not valid, denying access to the associated service.

Example 18

The system of example 17, wherein the exchange of information with the user device to place the user device into a state to act as a beacon further delegates authority to the user device to allow other user devices to act as beacons.

Example 19

The system of example 17, wherein the request associated with the at least one cloud service comprises a beacon identifier.

Example 20

The system of examples 17, 18 or 19, wherein the authentication challenge is based on at least one of:

a beacon identifier;

the at least one cloud service; and a location of a beacon associated with the beacon identifier.

Example 21

A method for providing secure location based services comprising:

receiving, from a user device, a set of initial information comprising a beacon identifier;

identifying, based on the beacon identifier at least one associated service to be provided to a user of the user device;

sending to the user device, an authentication challenge;

receiving from the user device a response to the authentication challenge, the response to the authentication challenge allowing the user of the user device to be identified;

determining whether the response to the authentication challenge is valid;

responsive to the determination that the response to the authentication challenge is valid, providing access to the at least one associated service; and responsive to the determination that the response to the authentication challenge is not valid, denying access to the associated service.

Example 22

The method of example 21, wherein the set of initial information further comprises Global Positioning System (GPS) information obtained by the user device specifying the location of the user device.

Example 23

The method of examples 21, or 22, wherein the beacon identifier comes from either a beacon device or another user device.

Example 24

The method of examples 21, 22 or 23, wherein after determining whether the response to the authentication challenge is valid, method further comprises providing a list of services to the user device that the user is authorized to access.

Example 25

The method of example 24, further comprising receiving an indication of an authorized service the user desires to access.

Example 26

The method of examples 21, 22, 23, 24 or 25, wherein the authentication challenge is based on at least one of:
the beacon identifier;
the at least one associated service; and
the location of the beacon associated with the beacon identifier.

Example 27

The method of examples 21, 22, 23, 24, 25 or 26, wherein the set of initial information further comprises a user name or user identifier and wherein the method further comprises:
determining whether the user name or user identifier is on a list of approved user names or user identifiers associated with the beacon identifier; and
responsive the determination that the user name or user identifier is on the list of approved user names or user identifiers, skipping the authentication challenge and providing access to the at least one associated service.

Example 28

The method of examples 21, 22, 23, 24, 25, 26 or 27, wherein the user name or user identifier is obtained from a physical device in proximity to the user device.

Example 29

A method of any preceding example, wherein:
the at least one service is a file sharing service;
the beacon identifier comes from another use device; and
wherein prior to providing access to the file sharing service, the method further comprises:
evaluating whether the another user device is authorized to distribute the beacon identifier;
responsive to determining that the another user device is authorized to distribute the beacon identifier, providing access to the file sharing service.

Example 30

A method of example 29, further comprising:
responsive to determining that the another user device is not authorized to distribute the beacon identifier, denying access to the file sharing service.

Example 31

A method of any preceding example, wherein the at least one service is a file sharing service and wherein the method further comprises:
after determining that the response to the authentication challenge is valid:
determining whether the user device is authorized to act as a beacon device;
responsive to determining that the user device is authorized to act as a beacon device, transferring a device beacon ID to the user device in order to configure the user device as the beacon device.

Example 32

A method of example 31, further comprising identifying whether the user device already has the device beacon ID and responsive to determining that the user device already has the device beacon ID, refraining from transferring the device beacon ID to the user device.

Example 33

A method of any preceding example further comprising creating at least one data structure in a location based service store, the at last one data structure comprising one or more of:
a devices information data structure comprising at least one of a device ID, an owner ID, and a category;
a location information data structure comprising at least one of a location ID, a physical location descriptor, and a category;
a user information data structure comprising at least one of a user ID, and an active device ID; and
an application location mapping data structure comprising at least one of an application ID, a mapped ID, a permissions descriptor, and a platform descriptor.

Example 34

An apparatus comprising means to perform a method as illustrated in any preceding example.

Example 35

Machine-readable storage including machine-readable instructions, when executed, to implement a method or realize an apparatus as illustrated in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for providing secure location based services comprising:
   receiving, from a user device, a set of initial information comprising a beacon identifier;
   identifying a set of services to be provided to authorized users based on the beacon identifier;
   sending to the user device, an authentication challenge;
   receiving from the user device a response to the authentication challenge, the response to the authentication challenge allowing the user of the user device to be identified;
   determining whether the response to the authentication challenge is valid;
   responsive to the determination that the response to the authentication challenge is valid;
      sending information to the user device describing a subset of the set of services that the user is authorized to access; and
      providing access to a selected service of the subset; and
   responsive to the determination that the response to the authentication challenge is not valid, denying access to the set of services.

2. The method of claim 1, wherein the set of initial information further comprises Global Positioning System (GPS) information obtained by the user device specifying the location of the user device.

3. The method of claim 1 wherein the beacon identifier comes from either a beacon device or another user device.

4. The method of claim 1, further comprising receiving an indication of an authorized service the user desires to access.

5. The method of claim 1, wherein the authentication challenge is based on at least one of:
   the beacon identifier;
   the subset of the set of services; and
   the location of the beacon associated with the beacon identifier.

6. The method of claim 1, wherein the set of initial information further comprises a user name or user identifier and wherein the method further comprises:
   determining whether the user name or user identifier is on a list of approved user names or user identifiers associated with the beacon identifier; and
   responsive the determination that the user name or user identifier is on the list of approved user names or user identifiers, skipping the authentication challenge and providing access to the subset of the set of services.

7. The method of claim 6, wherein the user name or user identifier is obtained from a physical device in proximity to the user device.

8. A machine-readable medium having executable instructions encoded thereon, which, when executed by at least one processor of a machine, cause the machine to perform operations comprising:
   receive, from a user device, a set of initial information comprising a beacon identifier;
   identify, based on the beacon identifier at least one associated service to be provided to a user of the user device;
   send to the user device, an authentication challenge;
   receive from the user device a response to the authentication challenge, the response to the authentication challenge allowing the user of the user device to be identified;
   determine whether the response to the authentication challenge is valid;
   responsive to the determination that the response to the authentication challenge is valid;
      sending a list of the at least one service to the user device; and
      providing access to the at least one associated service; and
   responsive to the determination that the response to the authentication challenge is not valid, denying access to the at least one associated service.

9. The machine-readable medium of claim 8, wherein the set of initial information further comprises Global Positioning System (GPS) information obtained by the user device specifying a location of the user device.

10. The machine-readable medium of claim 8, wherein the beacon identifier comes from either a beacon device or another user device.

11. The machine-readable medium of claim 8, further comprising receiving an indication of an authorized service the user desires to access.

12. The machine-readable medium of claim 8, wherein the authentication challenge is based on at least one of:
   the beacon identifier;
   the at least one associated service; and
   a location of a beacon associated with the beacon identifier.

13. The machine-readable medium of claim 8, wherein the set of initial information further comprises a user name or user identifier and wherein the operations further comprise:
   determining whether the user name or user identifier is on a list of approved user names or user identifiers associated with the beacon identifier; and
   responsive to determining that the user name or user identifier is on the list of approved user names or user identifiers, skipping the authentication challenge and providing access to the at least one associated service.

14. The machine-readable medium of claim 8, wherein the at least one associated service comprises at least one of:
   a file sharing service allowing the user to share files, download files, or both share and download files;
   a calendaring service providing access to either a calendar item associated with the user, a calendar item associated with the beacon identifier, or both a calendar item associated with a user and a calendar item associated with the beacon identifier;
   a collaboration service allowing collaboration among at least a portion of users that have been granted access to the associated service;
   a screen sharing service allowing screen sharing among at least a portion of users that have been granted access to the associated service;
   a chat service allowing screen communication among at least a portion of users that have been granted access to the associated service;
   a help service allowing the user to receive help from a chatbot, a person or both a chatbot and a person;
   a mapping service allowing the user to see a map of the area surrounding a physical location associated with the beacon identifier; and
   a service listing showing services that are available and are associated with the beacon identifier.

15. A computing system comprising:
   a processor and executable instructions accessible on a machine-readable medium that, when executed, cause the system to perform operations comprising:
      receive, from an administrator, configuration information for at least one cloud service, the configuration information comprising a set of users authorized to act as a beacon for the at least one cloud service;

receive, from a user device, a request associated with the at least one cloud service, the request comprising a first identifier;

send to the user device, an authentication challenge;

receive from the user device a response to the authentication challenge, the response to the authentication challenge allowing a user of the user device to be identified;

determine whether the response to the authentication challenge is valid;

responsive to the determination that the response to the authentication challenge is valid:

determine whether the user of the user device is a member of the set of users authorized to act as a beacon for the at least one cloud service;

responsive to the determination that the user is a member of the set of users authorized to act as a beacon for the at least one cloud service, exchange information with the user device to place the user device into a state to act as a beacon for the at least one cloud service, the user device having a beacon identifier different from the first identifier;

providing access to the at least one cloud service; and responsive to the determination that the response to the authentication challenge is not valid, denying access to the at least one cloud service.

16. The system of claim 15, wherein the exchange of information with the user device to place the user device into a state to act as a beacon further delegates authority to the user device to allow other user devices to act as beacons.

17. The system of claim 15, wherein the authentication challenge is based on at least one of:

the first identifier;

the at least one cloud service; and a location of a beacon associated with the first identifier.

\* \* \* \* \*